United States Patent [19]

Kadlicko

[11] Patent Number: 5,713,204
[45] Date of Patent: Feb. 3, 1998

[54] TURBO COMPOUNDER

[75] Inventor: George Kadlicko, Mississauga, Canada

[73] Assignee: 814405 Ontario Limited, Mississauga, Canada

[21] Appl. No.: 325,332

[22] PCT Filed: Apr. 26, 1993

[86] PCT No.: PCT/CA93/00176

§ 371 Date: Jan. 9, 1995

§ 102(e) Date: Jan. 9, 1995

[87] PCT Pub. No.: WO93/22546

PCT Pub. Date: Nov. 11, 1993

[30] Foreign Application Priority Data

Apr. 25, 1992 [GB] United Kingdom .................... 9208998
Jun. 22, 1992 [GB] United Kingdom .................... 9213219

[51] Int. Cl.$^6$ ................................................ F02B 37/12
[52] U.S. Cl. ........................................ 60/608; 60/605.1
[58] Field of Search ...................... 60/607, 608, 605.1; 91/497

[56] References Cited

U.S. PATENT DOCUMENTS

| | | | |
|---|---|---|---|
| 2,673,526 | 3/1954 | Horton | 91/497 |
| 3,389,554 | 6/1968 | Wolf | 60/608 |
| 4,083,188 | 4/1978 | Kumm | 60/608 |
| 4,312,183 | 1/1982 | Regar | 60/608 |
| 4,617,799 | 10/1986 | Todokoro et al. | 60/602 |
| 4,729,225 | 3/1988 | Bucher | 60/608 |
| 4,803,969 | 2/1989 | Hiereth et al. | 60/608 |

FOREIGN PATENT DOCUMENTS

| | | |
|---|---|---|
| 3532938 | 9/1986 | Germany . |
| 3623676 | 2/1988 | Germany . |

*Primary Examiner*—Michael Koczo
*Attorney, Agent, or Firm*—Ladas & Parry

[57] ABSTRACT

A turbo compounder includes an exhaust driven turbine (19) to supply compressed gas to the engine intake (17a). A transmission (23) that includes a variable ratio transmission element transfers energy between the turbine (19) and an engine derived energy reserve (27). A controller (16) adjusts the ratio of the transmission to manage the energy transfer by monitoring a predetermined operating parameter of the engine (10).

15 Claims, 10 Drawing Sheets

TURBO COMPOUNDER

The present invention relates to turbo compounders.

It has long been recognized that internal combustion engines reject a significant amount of useful work in the exhaust gases produced by the engine. It is also well recognized that the output of the engine can be improved by increasing the charge for each cylinder by compressing the inlet gases.

Advantage is taken of both these characteristics when using a turbo charger which essentially is an exhaust driven turbine that drives a compressor and delivers compressed air to the intake of the engine. The delivery of compressed air is, however, dependent upon the turbine characteristics which must be made to operate over a wide range of conditions. Under certain conditions, therefore, the turbine does not receive sufficient energy from the exhaust gases to compress the intake air and the engine does not operate efficiently. At other times the exhaust gas flow is sufficiently high that the mass flow supplied to the intake is too great. As a result, exhaust gases are bypassed around the turbine to avoid overcharging of the engine.

It has also been recognized that increased benefits in terms of energy recovery can be obtained if the exhaust driven turbine is used to drive not only the compressor but also to supply useful work to supplement the output of the engine. This, however, places a further inhibition on the operation of the engine since, under certain conditions, the turbine is unable to deliver useful work and indeed the attempt to extract useful work from the turbine may impede the supply of compressed air to the intake.

With compression ignition engines, the speed of the engine is regulated primarily by the fuel supply. In order to increase the speed or power output of the engine, the fuel supply is increased by operation of an "accelerator" control. However, when the control is adjusted, excess fuel is supplied to the engine until it has attained an increased speed. During acceleration, therefore, the fuel/air mixture is rich which leads to the production of excessive pollutants. This is particularly noticeable where the engine is turbocharged but is operating in the condition where the turbocharger is not receiving sufficient energy from the exhaust to provide compressed air to the intake.

There is therefore a need for a system that manages the transfer of energy between the engine output and the turbocharger and facilitates control of an engine to improve the energy recovered and mitigate the pollutants produced.

It is therefore an object of the present invention to provide a turbo compounding system in which the above disadvantages are obviated or mitigated.

According to the present invention, there is provided an internal combustion engine to deliver work to an output shaft and having an air intake to receive combustion air and an exhaust to discharge combustion byproducts, said engine further comprising a compressor assembly having a turbine to receive combustion byproducts from said exhaust to extract work therefrom and a compressor driven by said turbine to elevate the pressure of combustion air in said intake and a hydraulic transmission to transfer work between said compressor assembly and said output shaft, said transmission including a first variable capacity machine operably connected to said compressor assembly and adjustable to extract work from said turbine and to deliver work to said compressor, a second variable capacity machine operably connected to said output shaft to receive work therefrom, a fluid pressure reservoir connected to each of said first and second variable capacity machines to receive fluid pressure therefrom and deliver fluid pressure thereto, and a controller including a first control operable upon said first machine to adjust the capacity thereof to maintain said compressor at a predetermined operating condition and a second control operable upon said second machine to vary the capacity thereof to maintain said reservoir at a predetermined operating condition.

Embodiments of the invention will now be described by way of example only with reference to the accompanying drawings, in which.

A first embodiment of the invention will be described in general terms to appreciate the overall operation thereof with a more detailed description of preferred implementations following.

Figure 1:
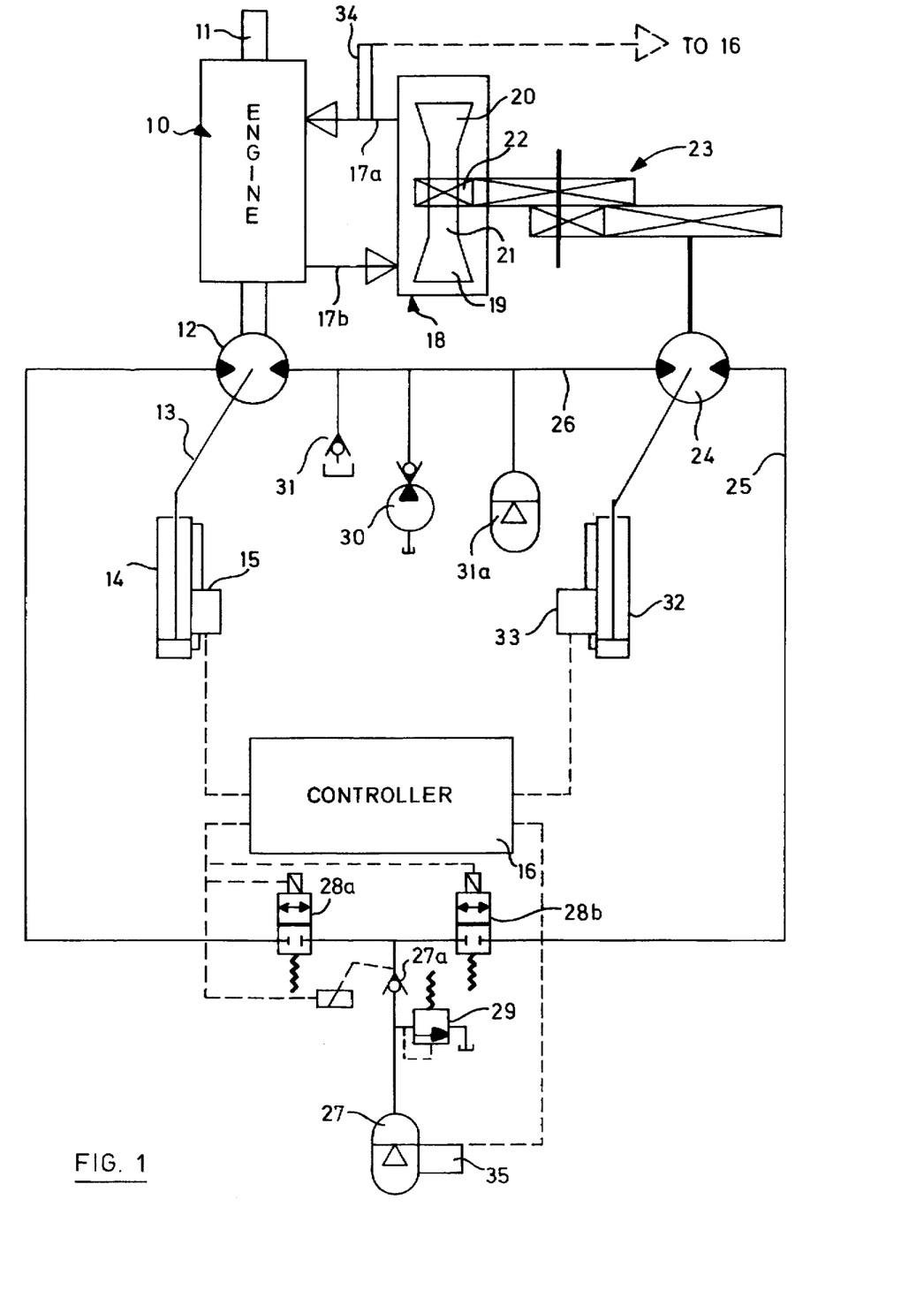
FIG. 1 is a schematic representation of a turbo compounder and associated control system.

Referring therefore to FIG. 1, a fuel-injected compression ignition engine 10 has an output shaft 11 connected to an external load (not shown) such as a vehicle transmission. Engine 10 also drives a hydraulic machine 12 (commonly referred to as a "pump" or "motor"). The machine 12 is of the variable capacity type whose displacement may be adjusted to either side of a null or zero displacement position and it may operate as either a pump or motor with a constant direction of rotation of the shaft 11.

The capacity of machine 12 is controlled by an operating member 13 whose position is regulated by a hydraulic motor 14. Movement of hydraulic motor 14 is controlled by a servo valve 15 described in more detail below, and receiving control signals from a controller 16. In the preferred embodiment, the machine 12 is pressure-compensated and thus modulates its capacity to maintain a constant pressure at the outlet.

Combustion air is supplied to the engine 10 through an intake manifold 17a and discharged from the engine 10 through an exhaust manifold 17b. The pressure of air supplied to the intake manifold 17a is elevated by a compressor assembly 18. The compressor assembly 18 includes a turbine 19 to extract energy from the exhaust gases and drive a compressor 20 through a shaft 21. A spur gear 22 is mounted on shaft 21 and forms part of a gear train 23 that acts as a reduction gear and provides drive to a variable capacity hydraulic machine 24 similar to the machine 12.

The machine 24 is hydraulically connected to the machine 12 by a supply duct 25 and a return duct 26 and the machines 24,12 are controlled so that the supply duct 25 operates at all times as the high pressure duct and the return duct 26 as the low pressure duct. It will be appreciated that the hydraulic connections between the machines 12 and 24 will vary depending on the type of machine used and that the arrangement shown in FIG. 1 is simply a schematic of the functional arrangement to be implemented. The details of such arrangements are well known in the art and will therefore not be described in further detail.

An hydraulic accumulator 27 is connected in the supply duct 25 through a solenoid operated check valve 27a and is protected by a high pressure relief valve 29. A pair of solenoid-operated shut-off valves 28a, 28b direct flow in the duct 25 under the control of controller 16. Accumulator 27 acts as a reserve of energy to ensure that a supply of pressurized fluid is available to the duct 25 at all times. A make up pump 30 is connected to the return duct 26 whose maximum pressure is controlled by a low pressure relief valve 31. A fluid reserve in the low pressure line 26 is provided by an accumulator 31a.

The capacity of machine 24 is controlled by a servo motor 32 and servo valve 33 which receives control signals from the controller 16. The capacity of machine 24 is controlled principally by a parameter indicative of the operation of the compressor 20 and operates to maintain that parameter at a predetermined value as determined by controller 16. The parameter selected in this embodiment is the intake manifold pressure which is monitored by a pressure transducer 34 to provide control signals to the controller 16. An alternative parameter that may be used is the mass flow in intake duct 17a. It will be appreciated that the reference value for the control parameter may vary under different operating conditions, e.g. a high load condition being associated with a high intake pressure, and that controller 16 will establish such reference values in accordance with a previously determined algorithm or in reference tables stored in controller 16 and derive error signals based on such reference values in known manner.

The controller 16 regulates operation of the machine 12 principally on the value of pressure in the supply duct 25 which is also the pressure in the accumulator 27. For this purpose, a pressure transducer 35 is connected to the accumulator 27 and generates signals to the controller 16.

As explained more fully below, the provision of a variable transmission constituted by the machines 12 and 24 allows the controller 16 to manage the energy transfer between the engine 10 and compressor assembly 18 so that if there is surplus energy in the exhaust gas, it may be used to replenish the accumulator 27 and to drive output shaft 11 and if there is an energy deficit in the exhaust gas, energy may be transferred from accumulator 27 and the engine to the compressor assembly 18.

The engine may be started using a conventional starter assembly but in the preferred embodiment the machine 12 is used as a starter. Machine 12 is conditioned to a full motoring configuration and the shut-off valve 28a and check valve 27a are opened to supply fluid from accumulator 27. The valve 28b is not opened by the solenoid until engine cranking speed has been attained. Once cranking speed is attained (or after a predetermined delay), the valve 28b is opened and fluid is supplied from the accumulator through the duct 25 to machine 24. The machine 24 is rotated by the fluid supplied from the accumulator 27 to the duct 25 and rotates the turbine assembly 18 through the gear train 23.

Rotation of turbine assembly 18 causes air to be delivered to intake duct 17a and fuel is supplied to engine 10 so that combustion commences. The machine 24 thus acts to transfer energy from the reserve provided by accumulator 27 to the compressor assembly 18 to make up the deficit in the exhaust gas.

With the engine 10 operating, the exhaust gas in the exhaust manifold 17b provides work to the turbine 19 in addition to that supplied by the machine 24. The speed of the compressor 20 is thus increased, causing the pressure in manifold 17a to rise. As a preset pressure is attained, the controller 16 reduces the stroke of the machine 24 so that the torque supplied to the gear train 23 is reduced. Eventually a neutral condition is attained in which sufficient power is being supplied through machine 24 to compensate for any deficit in the energy recovered from the exhaust gas necessary to maintain the compressor at its operating condition.

At the same time, with the engine delivering power, the controller 16 reverts to a pressure compensating mode for the machine 12 so that the machine 12 is moved to a pumping mode by servo 15 to replenish the accumulator 17 and supply the fluid to the machine 24 to drive compressor 20. As the accumulator 27 is replenished, the pressure in duct 25 rises to a preset level so that the machine 12 is destroked until its output matches the fluid consumed by the machine 24.

If the speed of the engine 10 is increased, for example due to an increased fuel supply, the mass flow of exhaust gas will also increase, providing more energy to the turbine 19. The compressor speed 20 will thus increase, causing an increase in the pressure in the inlet manifold 17a. This is sensed by the controller 16 which reduces the capacity of the machine 24 accordingly. The capacity of machine 12 will also be reduced as less fluid is being consumed by the machine 24.

Similarly, if the engine speed drops, due to an increased load for example, the manifold pressure drops, the capacity of machine 24 increases, and additional torque is supplied to the gear train 23 to accelerate the compressor 20 and increase the manifold pressure. During acceleration, the accumulator 27 supplies the increased flow required by the machine 24 and is subsequently replenished by adjustment of the machine 12.

As the engine speed increases, there will be sufficient mass flow in the exhaust to drive compressor 20 and maintain the requisite manifold pressure. At this stage the energy required from the machine 24 is zero so that its capacity will have been reduced to zero. If the exhaust gases have surplus energy, the compressor 20 will continue to accelerate, causing the manifold pressure to increase. The increased pressure is detected by controller 16 and moves machine 24 overcenter so that it now acts as a pump to deliver fluid to the duct 25. The pressure in duct 25 will thus increase, causing the control 16 to move the machine 12 overcenter into a motoring mode. In this mode, energy is transferred to the engine 10 and accumulator 27. If the manifold pressure continues to rise, the capacity of machine 24 will continue to increase, absorbing more energy, and the capacity of machine 12 will also increase as the pressure rises to transfer more energy to the engine 10. An equilibrium will be reached in which the machine 24 is absorbing the energy produced by the exhaust gases that is surplus to that needed to drive the compressor 20.

A reduction in manifold pressure will lead to a reduction in capacity and, ultimately, to a reversion to the delivery of energy to the compressor assembly 18.

In general, therefore, the machine 24 acts to manage the energy transfer between the engine 10 and compressor assembly 18 and allows the consumption of energy and its direction of flow to be adjusted. The control of machine 24 ensures that the compressor assembly 18 operates to deliver air at the requisite pressure to the engine 10 and thereby improve its combustion efficiency. The provision of a reserve of fluid energy also enables the machine 24 to be adjusted in an anticipatory manner rather than requiring a response from the engine 10 before an adjustment can be made. Thus, a control signal to increase the power output of the engine 10 may initially cause controller 16 to establish a higher reference pressure in the intake 17a. The machine 24 will adjust to supply work to the compressor assembly 18 (or reduce the work extracted) so that the compressor 20 is accelerated and the higher pressure established. The extra fuel may then be supplied to increase the power output. The additional work required to accelerate the compressor 20 may be supplied by the accumulator 27 and then replenished by adjustment of the machine 12. The pressure controlling of the machine 12 permits its independent adjustment and ensures that the energy delivered by the engine 10 is maintained at the level necessary to provide satisfactory operation of the compressor assembly 20.

The arrangement shown in FIG. 1 shows the engine 10 driving the transmission to control the operation of the compressor assembly 18. However, it will also be appreciated that the machine 12 could be associated with external loads driven by the engine and need not be directly connected to it. Such an arrangement is shown more fully in FIG. 11. Like reference numerals will be used to denote like components but with the suffix "b" added for clarity.

Figure 11:
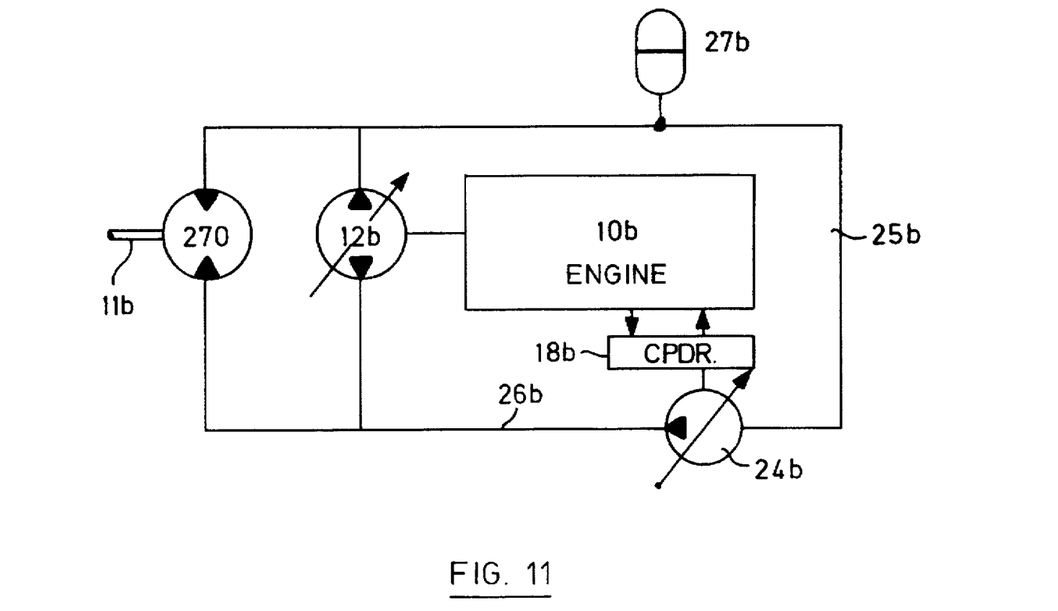
FIG. 11 is a schematic representation of an alternate engine power management system similar to FIG. 1.

In the embodiment of FIG. 11, the engine 10b drives a machine 12b that is connected through a conduit 26b to the variable capacity machine 24b associated with the compressor assembly 18b. In this arrangement, however, the engine 10b does not deliver useful work to a separate output shaft but useful work is extracted by connecting a hydraulic motor 270 in a hydrostatic loop with the pump 12b. In this way, the flow from the variable capacity hydraulic machine 24b that is derived when surplus energy is available from the compressor assembly 18a may be transferred directly to the hydraulic motor 270 for transfer to an output shaft 11b used to drive a conventional transmission or perform useful work. In this condition, the capacity of the pump 12b is reduced to a minimum as the useful work may be delivered directly from the machine 24b. In the event that energy is to be transferred to the compressor assembly 18b, the pump 12b operates to supply both the machine 24b and the motor 270 to provide the useful work. In this way, however, the maximum utilization is made of the energy that may be extracted through the compressor assembly 18b and directed directly to useful work. The accumulator 27b provides an energy reservoir to ensure a constant high pressure supply to the machine 24 when it is in the motoring mode.

As noted above, each of the servo motors 14,32 is controlled by a servo valve 15,33 whose operation is described more fully below with respect to FIG. 2 in conjunction with the operation of machine 24 in FIG. 1.

Movement of the motor 32 is controlled by a spool valve 40 which receives fluid from supply duct 25 and returns it through drain duct 43 to a sump. The spool valve 40 is a three-position spool valve movable to either side of the neutral position and is connected to the motor 32 by control lines 44,45.

Movement of the spool valve 40 is regulated by a first pair of pilot lines 46,48 which are connected between the control lines 44,45 and opposite ends of the spool 40 respectively. The spool valve 40 is also subjected to pilot lines 50,52 whose relative pressures are modulated in a complementary manner by means of a control valve assembly generally indicated at 54.

Fluid for control valve assembly 54 is supplied from the supply duct 25 and directed to the pilot lines 50,52 through flow restrictors 55,56 respectively. Pressure in the pilot lines 50,52 is controlled by a pair of variable orifices 58,60 respectively that are adjusted by a common operator 62 moved by an electrical coil 64. Current for the coil 64 is supplied from control 16 that receives additional control signals 68 indicative of the operating parameters of the engine and interfaces with the fuel pump associated with engine 10.

The controller 16 may be of many different forms operable to receive appropriate control signals and modulate the current supplied to the coil 64 in accordance with a predetermined control strategy. This strategy will depend upon the nature of the engine, e.g. whether it is a compression ignition engine or a spark ignition engine and the environment in which it is working, e.g. a stationary application or a vehicle application. In the embodiment illustrated, control signals 68 include an engine speed signal 68a, a turbine speed signal 68b, a capacity signal 68c derived from the capacity of the machine 24, and a manual control signal 68d indicating a need to change the operating speed of the engine 10. These signals are in addition to the pressure signals referred to above.

If, for example, the pressure in the intake manifold 17a is less than desired, control module 16 adjusts the current to the coil 64 to move the operator 62 in a direction to restrict flow through the orifice 60. This causes pressure in the pilot line 52 to increase, causing the valve 40 to be moved to a position in which pressure is supplied to the control line 44. Control line 44 moves the motor 14 so that the capacity of the machine 24 is increased, assuming it is operating in a motoring mode, to supply additional torque to the compressor assembly 18. Once the desired pressure has been attained, the error signal from the controller 16 is removed, allowing the spool valve 40 to return to a neutral condition.

If the output of engine 10 is to be increased, a signal from the manual control—for example, the accelerator pedal of a vehicle—is supplied to the controller 16. A new reference pressure is set for the pressure in manifold 17a so that an error signal is derived by controller 16. This causes the control valve 54 to operate initially to increase the torque supplied to the compressor assembly 18 by increasing the capacity of machine 24 or decrease the energy being absorbed by adjusting the capacity of the machine 24. This increases the rotational speed of the compressor assembly 18 to raise the pressure in intake 17a. Pressurized fluid is supplied from accumulator 27 to increase the flow in line 25. Once the speed of compressor assembly 18 has increased and the requisite pressure has been attained, the supply of fuel from the associated fuel pump is increased and the output speed of the engine 10 rises. As the speed of engine 10 increases, the mass flow in the exhaust 17b and additional work is extracted by the turbine 19 to drive compressor 20. As a result, the pressure will continue to rise in the intake 17a and cause the controller 16 to reduce the capacity of the machine 24. If surplus energy is available for the exhaust gases, the speed of the compressor will continue to rise and the machine 24 will be moved to a pumping condition to supply fluid to replenish accumulator 27. If, however, the machine 24 remains in a motoring condition, the pressure in accumulator 27 will drop and machine 12 will be conditioned to increase its pumping capacity and supply the machine 24.

Figure 2:
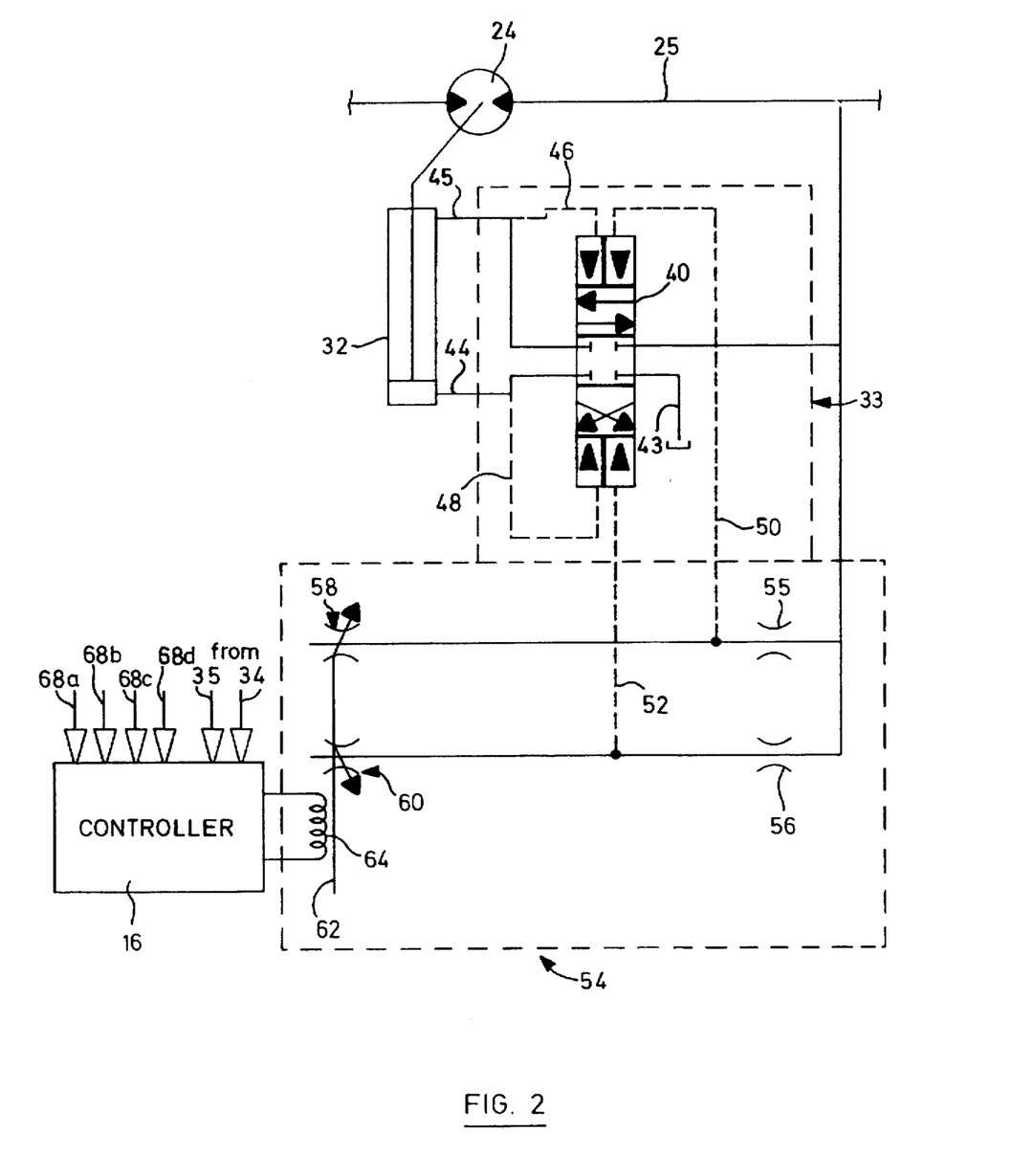
FIG. 2 is a schematic representation in further detail of a control system associated with the compounder of FIG. 1.

It will be appreciated that a similar form of servo valve to that shown in FIG. 2 can be used to control the machine 12 with the controller 16 modulating the current in accordance with deviations of the pressure in accumulator 27 from the reference valve.

It will be noted that in the operating condition discussed above, the controller 16 operates to ensure that the compressor 20 is supplying air to the intake manifold 17a and upon a requirement for additional fuel, ensures that additional air is initially supplied and therefore maintains the optimum operating characteristics in the fuel/air ratio. The direction of energy transfer is accomplished by controlling the machine 24 through the control valve 54 by adjustment of the orifices 58,60 and therefore the pilot pressures. This allows the compounder to be utilized with different controllers 16 operating on different strategies while still providing the benefits of supercharging and turbocharging as appropriate.

The controller shown in FIGS. 1 and 2, therefore, operates both as turbocharging control and as a compounder by virtue of the reversible transmission operating between the energy source and the compressor.

A particularly beneficial implementation of the turbo compounder shown schematically in FIGS. 1 and 2 and its associated controls are shown more fully in FIGS. 3 through 6.

Figure 3:
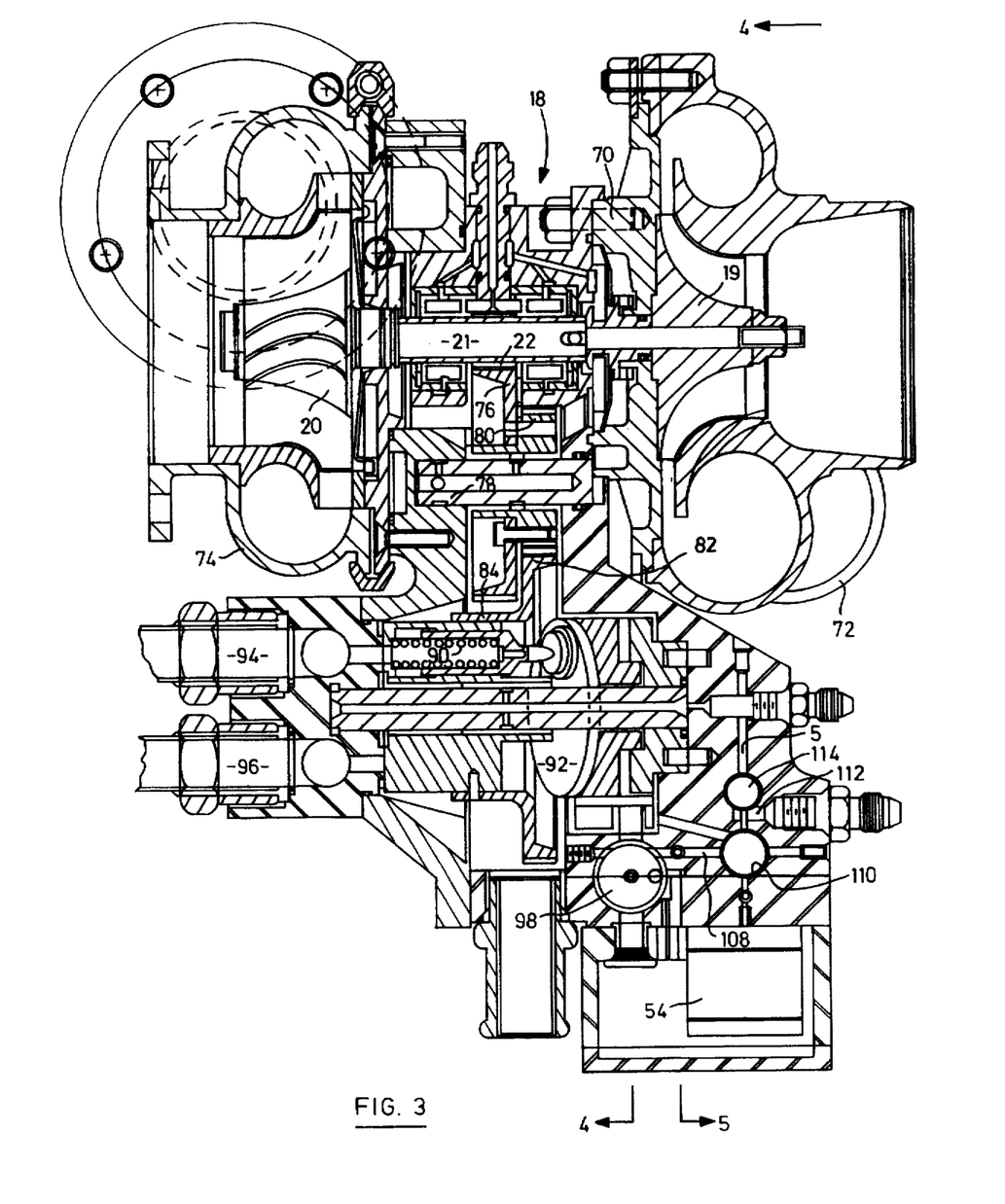
FIG. 3 is a section through a turbo compounder schematically depicted in FIG. 1.

The shaft 21 of compressor assembly as is rotatably supported within a housing 70 with the turbine 19 located at one end of shaft 21 within an exhaust volute 72 and the compressor 20 mounted at the opposite end inside an air intake volute 74. The spur gear 22 is also secured to shaft 21 intermediate the compressor 20 and turbine 19 and meshes with a larger diameter intermediate gear 76 that is carried on a shaft 78 located in the housing 70. The intermediate gear also carries a smaller diameter spur gear 80 which meshes with an output gear 82 connected to the barrel assembly 84 of a hydraulic machine 24. The barrel 84 includes a plurality of axial cylinders 88 with associated reciprocating pistons 90 that rotate with the barrel 84 and engage at their opposite end a tiltable swashplate 92. As the barrel 84 is rotated, the pistons 90 are caused to reciprocate within the cylinders 88 and transfer fluid between stationary ports 94,96, one of which is connected to line 25 and the other of which is connected to line 26. The operation of the pump 86 is well known in the hydraulics art and need not be described further, it being sufficient to note that as the swashplate moves over center, the machine 24 moves from a pumping mode to a motoring mode.

Figure 4:
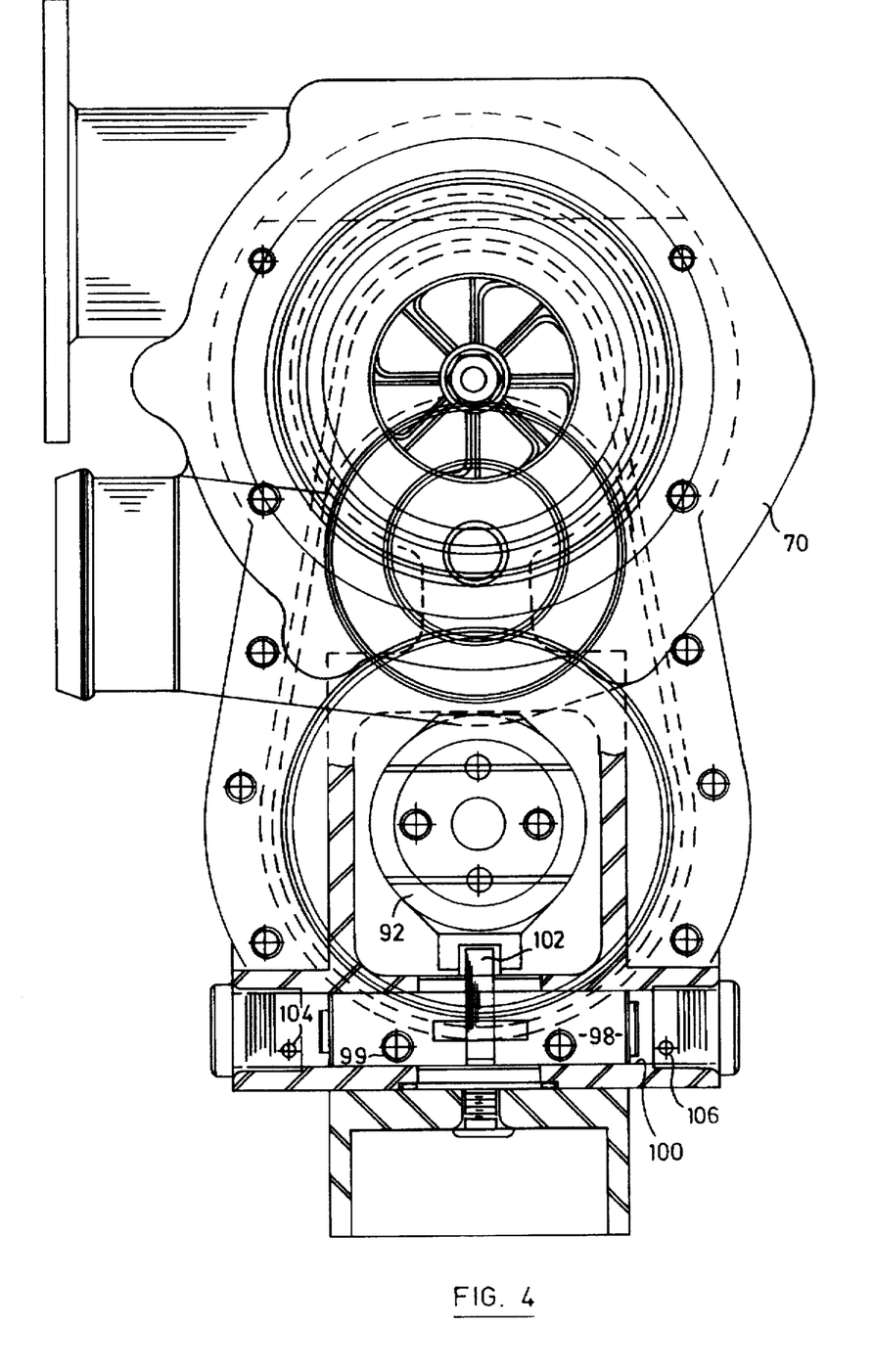
FIG. 4 is an end view partly in section of the turbo compounder shown in FIG. 2.

As can best be seen in FIG. 4, the tilt of the swashplate 92 is controlled by a double acting piston 98 located within a cylinder 100 formed in the housing 70. A peg 102 is carried by the piston 98 and engages a yoke associated with the swashplate 92, causing it to tilt as the piston 98 moves within the cylinder 100. The position of the piston 98 is monitored by a Hall effect transducer mounted in the wall of cylinder 100 and detecting movement of magnetic insert 99 mounted to the piston 98.

Fluid is supplied to opposite ends of the piston 98 through ports 104,106 which are supplied through internal passages indicated at 108 on FIG. 3 within the housing 70. The passages 108 extend to a cylindrical bore 110 that houses spool valve 40 used to control the piston 98 and shown in more detail in FIG. 5. The bore 110 is supplied with fluid from a pump inlet port 112 which delivers fluid to a filter bore 114 located in the housing 70 and also shown more fully in FIG. 5.

Figure 5:
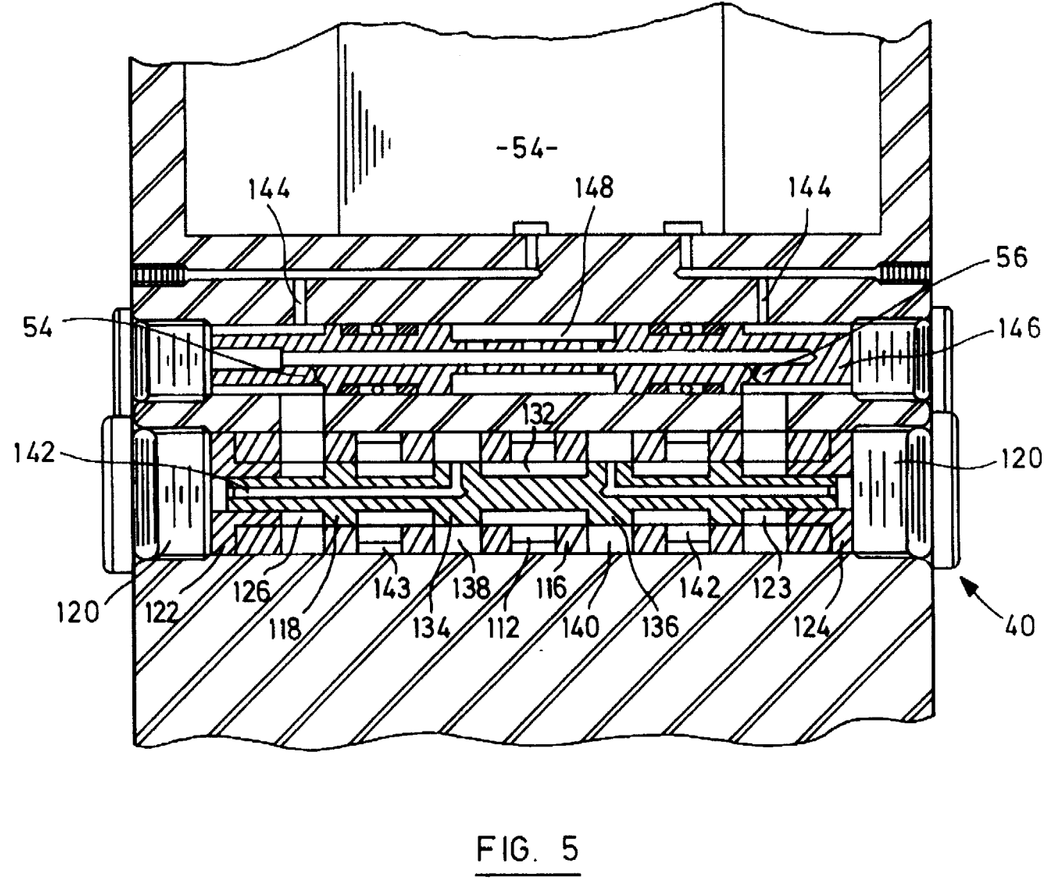
FIG. 5 is an enlarged view on the line 5—5 of FIG. 3.

Referring therefore to FIG. 5, the spool 40 includes an outer ported sleeve 116 sealed within the bore 110 and spool 118 that can reciprocate within the sleeve 116. The spool 118 is located within the sleeve 116 by end caps 120 which each support collars 122,124 to seal between the spool 118 and sleeve and define a pair of annular chambers 126,128.

The sleeve 116 receives fluid from the pump 42 through inlet port 112 and delivers it to a central annulus 132 located between a pair of lands 134,136. The lands 134,136 respectively cover ports 138,140 in the sleeve 116 which are connected to the supply ports 104,106 of cylinder 100 through internal passages 108. Spool 118 is also provided with lands 141 that are located outboard of drain ports 143 connected to sump line 43. Movement of the spool 118 in the sleeve 116 will thus connect the pressure port 130 with one of the supply ports 138,140 and the other port 138,140 to drain through ports 143 to move piston 98 within cylinder 100.

The spool 116 is also provided with internal drillings 142 that allow the ports 138,140 to communicate with the inner chamber 26 adjacent the end caps 122. Opposite ends of the spool 118, therefore, are subjected to the pressure within the respective internal ducts 108 on opposite ends of the piston 98.

The chambers 126,128 are connected to pilot lines 144 within the housing 70 through the filter cartridge 146. The filter cartridge 146 is supplied with pressure from the pump 42 through an extension of the port 130 and into an internal cavity 148. Flow from the internal cavity 148 to the internal passages 144 is controlled by orifices 54,56 formed in the filter body. The internal passages 144 extend to the control valve 54 shown more fully in FIG. 6.

Figure 6:
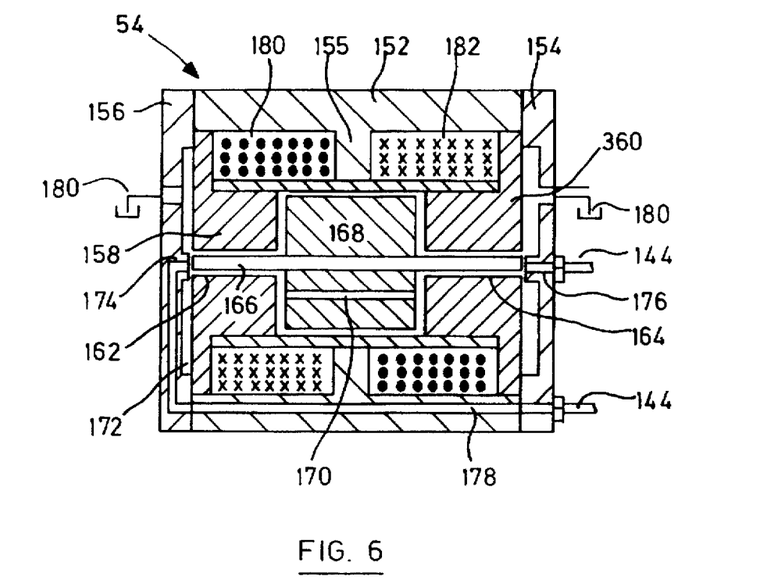
FIG. 6 is a sectional view of a controller used with the valve shown in FIG. 5.

Control valve 54 includes a cylindrical housing 152 having a pair of end caps 154,156. The housing 152 is provided with an inwardly directed flange 155 that supports a tubular partition 157. Partition 157 supports a pair of bearings 158,160 formed of a magnetically active material which are in an interference fit within the partition 156. The bearings 158,160 each have an axial bore 162,164 in which a non-magnetizable pin 166 slides. Pin 166 carries a magnetizable core 168 located between the bearing members 158,160 with a balance passageway 170 extending between the end faces of the core. A clearance fit is provided between the outer surface of the core 168 and the inner surface of the tubular partition 157 and the spacing of the end faces of the core 168 is such as to provide limited axial movement between the bearings 158,160.

End faces of the pin 166 are flush with the end faces of the bearing 158 and the cylindrical housing 152. Each of the end caps 154,156 is formed with an annular recess 172 with a central nozzle 174 aligned with the pin 166. The end face of the nozzle 174 is recessed slightly relative to the end faces of the end caps 154 typically in the order of 0.002 inches so that a maximum of 0.004 inches of movement is provided between the pin 166 and the end faces of the nozzles 174.

Fluid is supplied from one of the pilot lines 144 through an internal bore 176 to the nozzle 174 associated with end cap 156. The other pilot line 144 is connected to an internal duct 178 which supplies fluid to the nozzle 174 associated with the end cap 154. Drain ports 180,182 are provided in the end caps 154,156 respectively.

The co-operation between the nozzles 174 and the pin 166 constitute the variable orifices 58,60 used to control the pressure in the pilot lines 50,52 respectively. The control of the operating member 62 constituted by the core 168 and the pin 166 is provided by the coils 180,182 which together provide the coil 64 of FIG. 1. Coils 180,182 are located between the housing 152 and the partition 157 on either side of the radial flange 155. Current supplied to one or other of the coils will cause the pin 166 to move toward one of the nozzles 174 and therefore restrict the flow of fluid from the duct 176 or 178. This will increase the pressure in the associated one of the conduit passages 144 and therefore in the associated chamber 128.

In operation, therefore, the supply of current from the controller 16 to the coil 64 formed from the individual coils 181,182 in the valve 54 causes a corresponding displacement of the pin 166 within the housing 150. This causes the pressure in one of the internal passages 144 to increase while the pressure in the other one decreases and so unbalances the spool 118 due to the differential pressure in the chambers 128 at opposite ends of the spool 118. Spool 118 is thus moved relative to the sleeve 116 to allow fluid to flow from the pump inlet port 130 to one of the outlet ports 138,140. The piston 98 is thus displaced within the cylinder 100, causing the yoke to tilt the swash plate 92 in an appropriate direction. A magnetic insert 99 carried by the piston 100 co-operates with a Hall effect sensor in the wall of cylinder 100 to provide a position feedback to the controller 16 through a control line 68 in FIG. 2.

With the swashplate tilted to a motoring position, high pressure fluid in the port 94 delivers a torque through the gears 82,80,78 and 76 to the shaft 20 to rotate the compressor 17 within the intake volute 74. If the swashplate 92 is tilted in the opposite direction, power will be delivered from the turbine 18 through the gear train so that pressurized fluid is delivered at port 94. In this manner, control module 16 is operable through the valve 54 to adjust the variable transmission to control the transfer of energy between the reserve and the compressor assembly. Work may be extracted from the exhaust gases when available but work may also be applied to the compressor assembly to maintain its preferred operating parameters. Deviation from the selected parameters adjusts the transmission and therefore the energy transfer to maintain the parameters at a desired level. It will again be understood that the arrangement of valve 40 may be implemented with the control of the machine 12 with the current supply to the corresponding coil 64 being modulated to maintain the requisite pressure in accumulator 27.

A further embodiment of a turbo compounder is shown in FIGS. 7 through 10 and like reference numerals are used to denote like components to that of the embodiments of FIGS. 3 through 6 with a suffix "a" added for clarity of description. In the embodiments of FIGS. 7 through 10, the axial piston hydraulic machine 24 is replaced with a radial piston machine 24a and the scroll type intake volute 74 is replaced with a nozzle diffuser having a variable area nozzle to drive the turbine 19a. The radial piston machine 24a provides a finer control on the capacity of the machine 24a and therefore the energy transfer and this control is reflected in smaller variations in the speed of turbine 19a. The smaller speed variations allow a nozzle type diffuser to be used which is more efficient but has a smaller range of operation.

Figure 7:
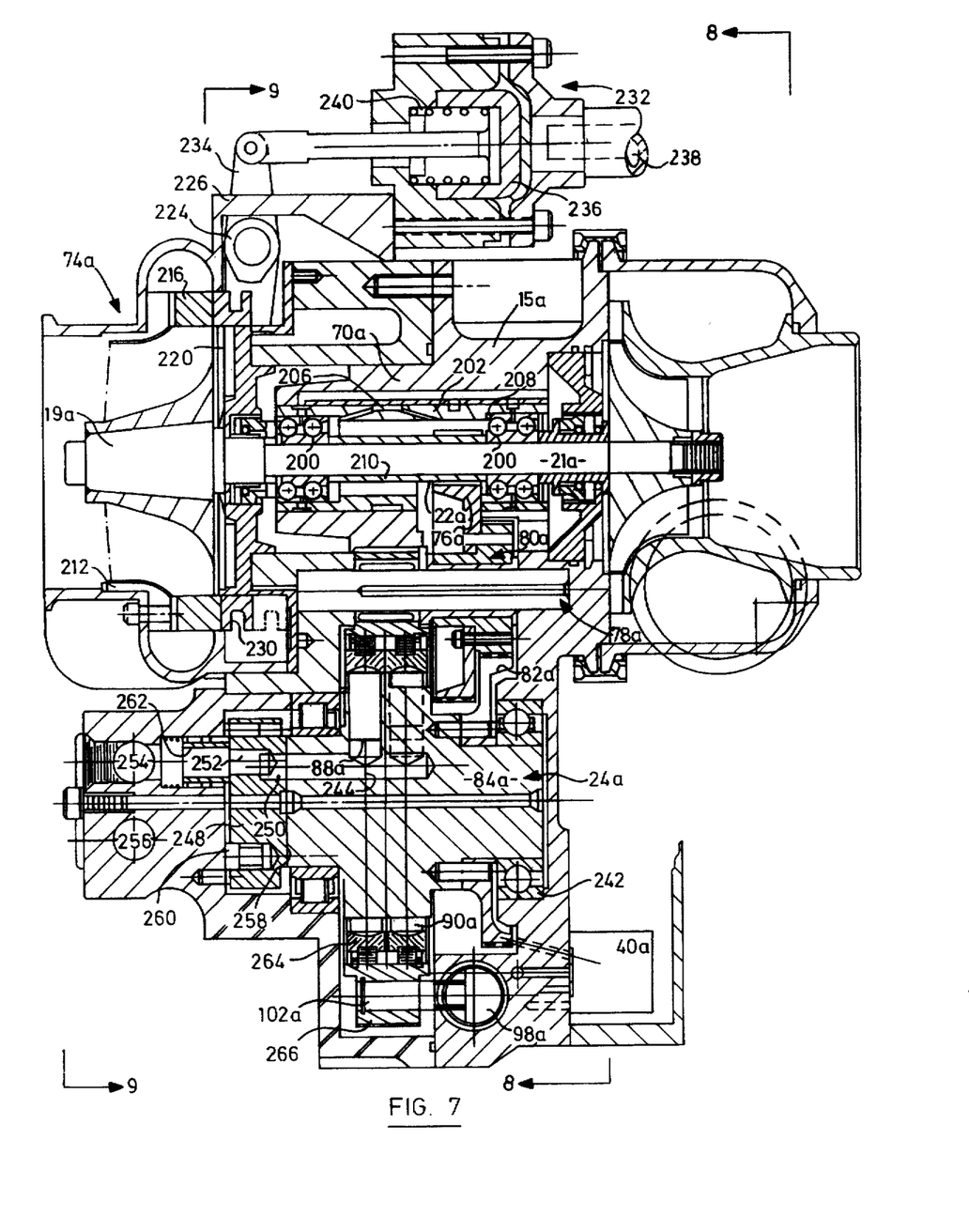
FIG. 7 is a sectional view of an alternate embodiment of turbo compounder.

Referring therefore to FIG. 7, shaft 21a of the compressor assembly 18a is rotatably supported on bearings 200 within housing 70a. Bearings 200 are located within a sleeve 202 and supplied with oil through ducts 204 that extend from an annular groove 206 connected to a charge pump of the hydraulic transmission. The bearings 200 are located within the sleeve 202 on a pair of spaced axial shoulders 208 so that the spacing between the outer race of the bearings 200 can be maintained at a close tolerance. The inner races of bearings 200 are maintained in spaced relationship by sleeve 210 so that the precise preload of the bearings 200 can be obtained. This ensures free running of the shaft 21a within the housing 70 and facilitates assembly of the compressor assembly 18a.

Turbine 19a is mounted on the shaft 21a within the intake volute 74a. A nozzle ring 212 is located in the intake volute 74a and includes a series of vanes 214 (best seen in FIGS. 9 and 10) arranged uniformly about the periphery of the turbine 19a. The vanes 214 provide nozzles for directing exhaust gas onto the turbine 19a at a constant angle of attack.

The cross-sectional area of the nozzles 212 is adjustable by means of a baffle 216 that is slidable axially relative to the axis of rotation of the turbine 19a. The baffle is annular and includes slots 218 complementary to the vanes 214. As such, the baffle 216 can move toward and away from the nozzle ring 212 with the vanes 214 sliding within respective ones of the slot 218 to determine the annular cross sectional area of the nozzle 212.

The baffle 216 is slidably mounted upon a cylindrical extension 220 of the housing 70a and its axial movement is controlled by a yoke 224 pivoted to the housing 70a on a spindle 226. The yoke 224 includes a pair of radial pins 228 that engage in a circumferential groove 230 formed in the baffle 216 so that the baffle follows movement of the yoke 224.

Rotation of the spindle 226 is controlled by a piston assembly 232 connected to the spindle 226 through an arm 234. The piston assembly 232 includes a flexible diaphragm 236 that is connected through conduit 238 to the intake manifold 17a (FIG. 1). The diaphragm 236 is biassed by a spring 240 to a position in which the baffle 216 provides a minimum cross sectional area for the nozzle 212. As the manifold pressure increases, indicating an increased mass flow, the diaphragm 236 moves the arm 234 to rotate spindle 226 and move the baffle plate 216 to increase the cross sectional area available through the nozzle 212. In this way, the optimum velocity of the exhaust gases on the turbine 19a can be maintained. Nozzle type diffusers have been found to be more efficient within a narrow speed range than scroll type intake volutes but the variations in compressor assembly speed normally associated with turbo chargers has made it generally undesirable to utilize these devices. However, the energy management provided through the transmission 24a provides a closer control on the operating speed of the compressor assembly and thereby permits the use of the more efficient nozzle type diffusers.

The speed control of the compressor assembly 18a is enhanced in the embodiments shown in FIGS. 7 through 10 through the use of a reversible radial piston machine 24a. Drive to the machine 24a is derived from a gear 22a mounted on the sleeve 210 and driving intermediate gears 76a, 80a mounted on a shaft 78a. The gear 80a meshes with a drive gear 82a secured to a rotatable barrel assembly 84a of the machine 24a. The barrel assembly 84a is rotatably mounted in the housing 70a on bearings 242.

The barrel assembly 84a includes a plurality of radial cylinders 88a each of which receives a piston 90a. The pistons 90a rotate with the barrel 84a and reciprocate within the cylinder 88a. It will be noted that the cylinders 88a and their respective pistons 90a are alternately staggered in the axial direction so that they define two sets of axially spaced pistons and cylinders. Each pair of pistons and cylinders 88a,90a communicates with a respective axial bore 244 that extends through the barrel 84a to an end face 246. A port plate 248 is mounted against the end face 246 and pinned to the housing 70a to prevent rotation with the barrel 84a. The port plate 248 includes a pair of kidney ports 250 located on a common radius to the bores 244. The kidney ports 250 communicate through ports 252 disposed at opposite ends of the kidney ports to internal conduits 254,256 formed in the housing 70a.

The adjacent ends of the kidney ports 250 are spaced one from one another so that as the barrel 84a rotates the bores 244 alternately traverse the two kidney ports 250 and are alternately connected to the conduit 254 and the conduit 256. As the bores 244 pass between the kidney ports 250, they are connected through a restricted orifice 258 to pressure balancing pistons 260 provided in the port plate 248. Pressure acts against the pistons 260 to maintain the port plate 248 sealed against the end face 246 and inhibit leakage between the kidney ports 250.

The sealing is also maintained by sleeves 262 that float within the conduits 254, 256 and bear against the port plate 252. Pressure in the conduits 254, 256 thus produces a net force acting to seal the port plate 248 against the end face 256. The sleeves 262 also accomodate any small misalignment between the housing 70a and the port plate 248 to maintain a seal.

Figure 8:
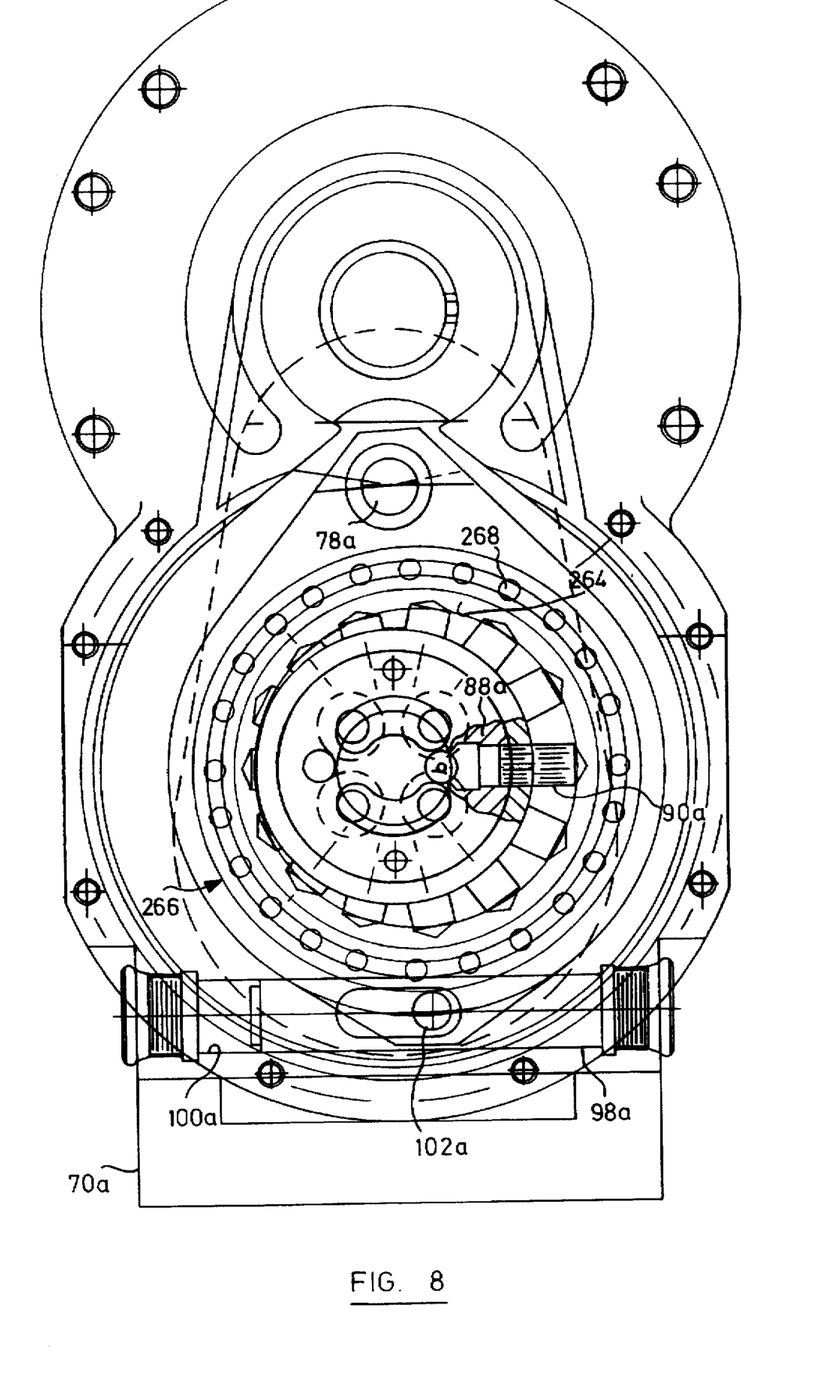
FIG. 8 is a view on the line 8—8 of FIG. 7.
Figure 9:
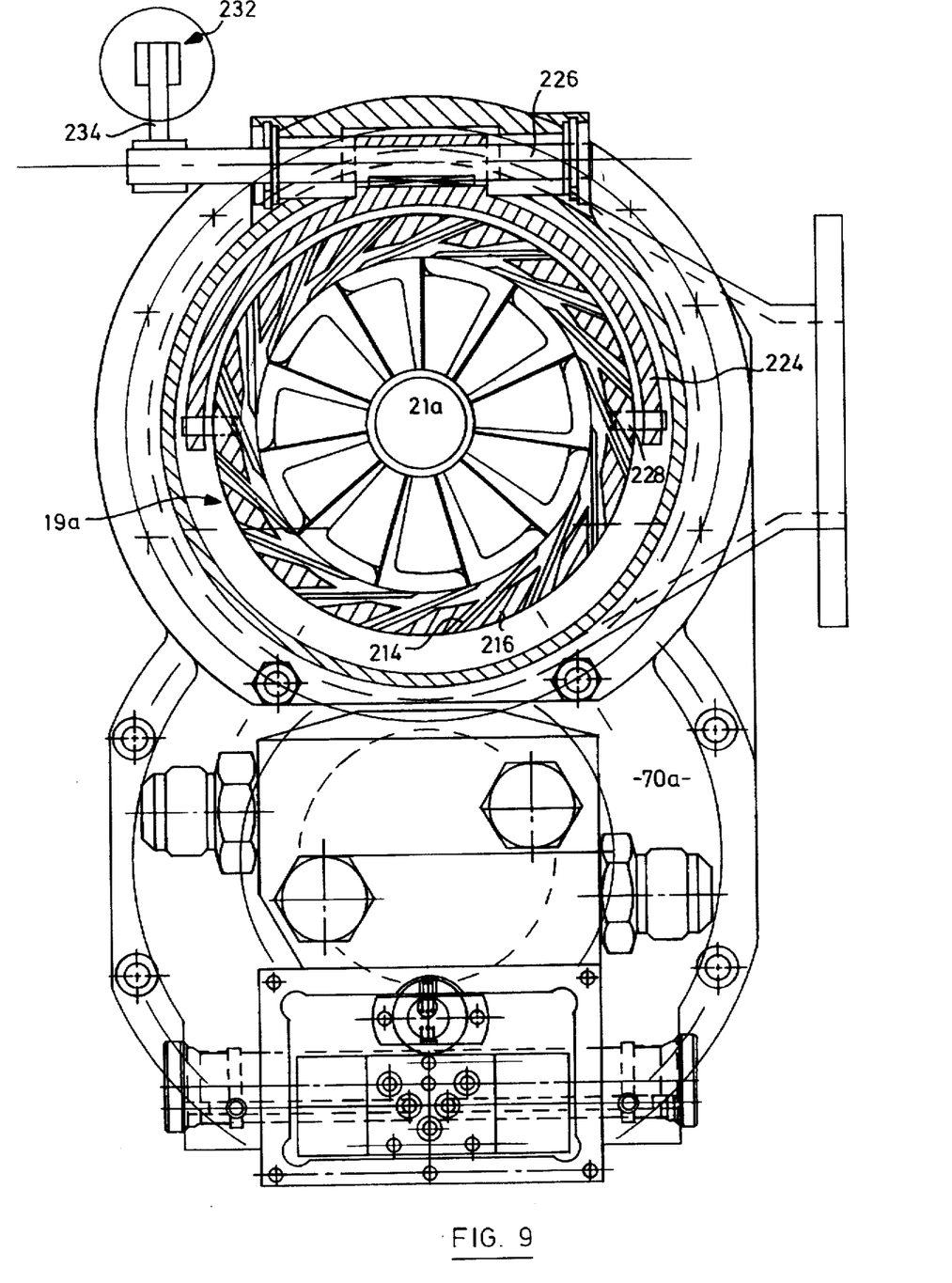
FIG. 9 is an end view on the line 9—9 of FIG. 7.
Figure 10:
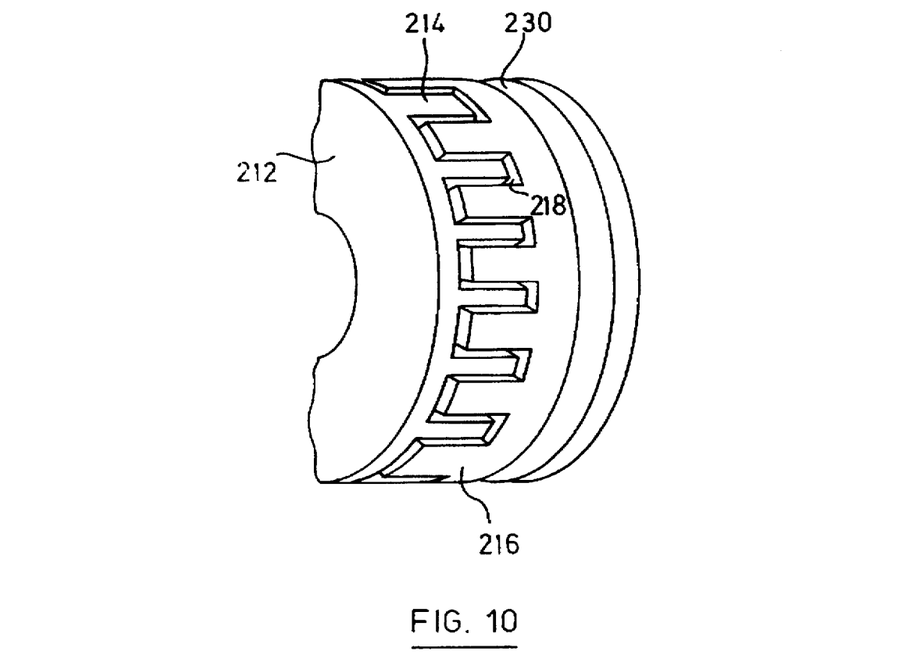
FIG. 10 is a perspective view of a portion of the compounder shown in FIG. 7.

The pistons 90a bear against a cam surface 264 formed as the inner surface of a capacity adjusting member 266. As best seen in FIG. 8, the adjusting member 266 is pivoted to the housing 70a on the shaft 78a and so may swing through a limited arc about the shaft 78a. The adjustment member 266 carries a pair of roller bearings 268 which serve to connect the cam surface 264 rotatably with the adjusting member 266. The cam surface 264 is circular but its eccentricity relative to the axis of rotation of the barrel 84a may be adjusted by pivotal movement of the adjusting member 266 about the shaft 78a.

The position of the capacity adjusting member 266 is controlled by a double acting piston 98a that is located within a cylinder 100a formed in the housing 70a. The piston 98a is connected to the operating member through a peg 102a so that as the piston 98a is moved within the cylinder 100a the adjusting member 266 moves about the shaft 78a and adjusts the eccentricity of the cam surface 264 relative to the barrel 84a. Adjustment of the piston 98a within the cylinder 100a is controlled by a servo valve indicated at 40a as described above with respect to the embodiments of FIGS. 3 through 6 and will not therefore be described further.

The capacity adjusting member 266 is moveable to a neutral position in which the axis of rotation of the cam surface 264 is coincident with the axis of rotation of the barrel 84a. In this position, rotation of the barrel assembly 84a does not cause any reciprocation of the pistons 90a within their cylinders 88a and no fluid is delivered from or to the machine 24a. If the piston 98a moves to either side of the neutral position, the axis of rotation of the cam surface 264 is displaced from that of the barrel 84a and rotation of the barrel 84a will cause reciprocation of the pistons 90a within their cylinders 88a. As the barrel 84a rotates, the pistons 90a reciprocate within the cylinders 88a and so during one-half of a revolution, the barrel fluid will be expelled from the cylinders 88a and during the other of the revolution, fluid will be drawn into their cylinders 88a. The kidney ports 150 are arranged so that the bores 244 traverse one of the kidney ports 150 as fluid is being expelled and traverse the other of the ports 150 as fluid is being drawn into the cylinder 88. Thus conduit 254 will act as a pressure conduit and the conduit 256 will act as a supply conduit. Conduit 254 is thus connected to conduit 26a (FIG. 1) and conduit 256 to conduit 25a.

Similarly movement of the piston 98a to the opposite side of the neutral position reverses the hydraulic machine 24a so that high pressure fluid delivered to the conduit 254 generates torque causing rotation of the barrel 84a and energy to be delivered to the shaft 21a of the compressor assembly 18a. Thus the radial piston machine 24a can operate in both a pumping mode and in a motoring mode so as to be combined with the engine driven pump 12a and modulated through the controller 16a in the manner described with respect to FIG. 1.

The radial piston machine 24a offers significant advantages in the particular application shown in FIGS. 7 through 10. In particular, the pressure forces acting on the barrel 74a are directed perpendicular to the direction in which the piston 98a has to be moved to adjust the capacity so that minimal forces oppose movement of the adjustment member 266. This makes control of the pump simpler and allows precise control of the pump particularly in the neutral position. The bearing 268 that rotatably supports the cam member 264 allows the cam member to rotate as the barrel 74a rotates and this reduces slippage between the pistons 74a and the cam ring. Such slippage as does occur produces an auxiliary motion of the pistons 90a within the cylinders 88a.

In operation, the turbo compounder shown in the embodiments of FIGS. 7 through 10 operate substantially the same as that as shown above with reference to FIGS. 1 and 2 and therefore its detailed operation will not be described. It should be noted however, that the precise control of the speed of the shaft 21 due to the energy transfer control provided by the variable capacity hydraulic machine allows the baffle 216 to modulate the area of the nozzles 212 and provide a high efficiency turbine 19a for maximum utilization of the energy extracted from the exhaust gases.

As noted with respect to the embodiment of FIGS. 7 to 10, the efficiency of turbine 19 and compressor 20 is sensitive to variations in operating conditions. While the adjustable nozzle arrangement in FIG. 10 alleviates this problem, the energy management system may be adopted as shown in FIG. 12 to provide similar benefits.

Figure 12:
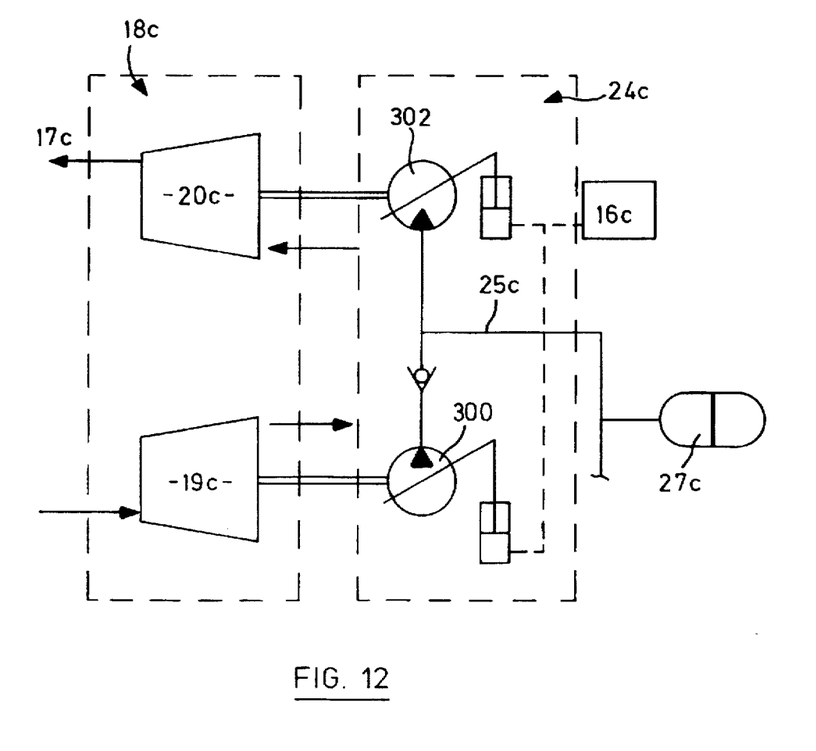
FIG. 12 is a further schematic of an alternative embodiment of engine management system.

In the embodiment of FIG. 12, in which similar components to those of previous embodiments are identified with like reference numerals with a suffix "c" added for clarity, the machine 24c is provided by a pair of hydraulic machines, namely a pump 300 and a motor 302. The pump 300 is associated with the turbine 19c and the motor 302 is associated with compressor 20c. The pump 300 is controlled by the controller 16c to maintain the turbine 19c at a constant rotational speed so that its efficiency is maximized. Thus, if the turbine speed drops below its optimum operating condition, the load imposed on it by pump 300 is reduced by reducing its capacity. Machine 300 will therefore deliver to the conduit 25c pressurized fluid at a flow rate compatible with the excess work available from the exhaust gas while maintaining the desired rotational speed.

The motor 302 drives the compressor 20c and is adjusted to maintain the desired parameter in the intake duct 17c. If the pump 300 delivers pressurized fluid to the motor 302 and if surplus is available, it will be used to replenish the accumulator 27c. If, however, pump 300 cannot supply sufficient fluid to drive the motor 302, additional fluid will be supplied from the conduit 25c, either from accumulator 27c or machine 12c.

Thus, by providing independent drives to the compressor assembly 18c, the requirements of each component may be met and at the same time the energy transfer may be managed as described above. It will also be appreciated that the pump 300 and motor 302 may be controlled with respective servo valves 40 similar to those described above with controller 16c modulating the current supply to each in accordance with deviations from the desired parameter.

We claim:

1. A turbo compounder for use with an engine delivering useful work having an air intake to receive combustion air and an exhaust to discharge combustion gas, said compounder including a compressor assembly having a turbine to receive combustion gas from said exhaust to extract work therefrom, and a compressor to deliver compressed gas to said intake and a variable ratio transmission to transfer work between said compressor assembly and a hydraulic fluid accumulator, and having a controller associated therewith to vary the ratio of said transmission in response to changes in the operating parameters of said engine, said transmission including a variable capacity hydraulic machine to transfer fluid between said machine and said hydraulic fluid accumulator, said machine having an operator to adjust the capacity thereof, said operator having a neutral position in which displacement of said machine is minimized and being movable to one side of said neutral position to condition said machine to transfer energy to said compressor assembly and to the opposite side of said neutral position to condition said machine to extract energy from said compressor assembly.

2. A turbo compounder according to claim 1 wherein said operator includes a hydraulic motor operable to vary the ratio of said variable capacity hydraulic machine and said controller includes a control valve to control movement of said motor.

3. A turbo compounder according to claim 2 wherein said control valve is a spool having a pilot pressure applied to opposite ends thereof to control movement of said motor.

4. A turbo compounder according to claim 3 wherein said controller modulates said pilot pressures in accordance with changes in the operating parameters of said engine.

5. A turbo compounder according to claim 4 wherein said controller modulates said pilot pressures in a complementary manner such that one of said pilot pressures increases as the other decreases.

6. A compounder according to claim 5 wherein each of said pilot pressures is modulated by a respective variable orifice.

7. A turbo compounder according to claim 6 wherein a common operator is provided to adjust said orifices conjointly.

8. A turbo compounder according to claim 7 wherein said common operating is controlled by an electrical coil whose current is controlled by an electrical control module.

9. A compounder according to claim 8 wherein said electrical control module receives control signals indicative of the operating parameters of said engine and controls the current supplied to the coil in response to changes of said parameters.

10. A turbo compounder according to claim 1 wherein said controller monitors output pressure of said compressor assembly and adjusts said operator to condition said transmission to transfer energy from said hydraulic fluid accumulator to said compressor assembly to maintain said output pressure therefor above a predetermined level.

11. A turbo compounder according to claim 1 wherein said variable capacity hydraulic machine is a variable capacity radial piston machine.

12. A turbo compounder according to claim 11 wherein said machine includes a stator and a rotor, said stator connected to said hydraulic motor and displaceable radially relative to said rotor by said hydraulic motor to adjust the capacity thereof.

13. A turbo compounder according to claim 12 wherein said stator is adjustable to either side of a position in which said stator and rotor are concentric.

14. A turbo compounder according to claim 13 wherein said stator is pivotally connected for movement relative to said rotor at a location diametrically opposed to said connection of said hydraulic motor.

15. A turbo compounder according to claim 14 wherein said hydraulic motor is double-acting and said control valve regulates pressure differentials acting across said motor.

* * * * *